United States Patent
Fuchs

(10) Patent No.: US 8,161,655 B2
(45) Date of Patent: Apr. 24, 2012

(54) MOTOR-DRIVEN RECIPROCATING SAW, IN PARTICULAR A JIGSAW

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 689 days.

(21) Appl. No.: 12/302,110

(22) PCT Filed: Sep. 20, 2007

(86) PCT No.: PCT/EP2007/059971
§ 371 (c)(1),
(2), (4) Date: Nov. 24, 2008

(87) PCT Pub. No.: WO2008/046712
PCT Pub. Date: Apr. 24, 2008

(65) Prior Publication Data
US 2009/0106986 A1   Apr. 30, 2009

(30) Foreign Application Priority Data

Oct. 20, 2006   (DE) .......................... 10 2006 049 530

(51) Int. Cl.
*B23D 49/00*   (2006.01)
(52) U.S. Cl. ......................................... 30/392
(58) Field of Classification Search ............. 30/392–394
See application file for complete search history.

(56) References Cited

U.S. PATENT DOCUMENTS

| | | | | |
|---|---|---|---|---|
| 2,747,622 A * | 5/1956 | Saye | ............................... | 30/394 |
| 3,097,430 A * | 7/1963 | Lewinski et al. | ............... | 30/392 |
| 3,388,728 A * | 6/1968 | Riley, Jr. et al. | ............... | 30/392 |
| 3,435,523 A * | 4/1969 | Marsh | ........................... | 30/272.1 |
| 3,456,698 A * | 7/1969 | Csaki | .............................. | 30/392 |
| 3,504,716 A * | 4/1970 | Bush et al. | ....................... | 30/392 |
| 3,533,161 A * | 10/1970 | Magnin | ........................... | 30/393 |
| 3,707,768 A * | 1/1973 | Spengler | ......................... | 30/392 |
| 3,895,438 A * | 7/1975 | Burkepile et al. | .............. | 30/392 |
| 4,213,242 A * | 7/1980 | Partington | ...................... | 30/392 |
| 4,235,017 A * | 11/1980 | Yavis | .............................. | 30/392 |
| 4,615,251 A * | 10/1986 | Volk | ................................ | 30/392 |
| 4,676,001 A * | 6/1987 | Wagner | .......................... | 30/393 |
| 4,680,831 A * | 7/1987 | Hogan | ............................ | 30/392 |
| 4,962,588 A * | 10/1990 | Fushiya et al. | ................. | 30/393 |
| 5,035,059 A * | 7/1991 | Takahashi et al. | .............. | 30/392 |
| 5,644,847 A * | 7/1997 | Odendahl et al. | .............. | 30/394 |
| 6,131,498 A * | 10/2000 | Gerber | ............................ | 30/393 |
| 6,282,793 B1 * | 9/2001 | Flagg | .............................. | 30/392 |

(Continued)

FOREIGN PATENT DOCUMENTS

| | | |
|---|---|---|
| CA | 2 267 576 | 2/2001 |
| CH | 618 914 | 8/1980 |
| DE | 3203733 A1 * | 8/1983 |
| DE | 103 00 793 | 7/2004 |
| DE | 10 2004 045 539 | 3/2006 |

(Continued)

*Primary Examiner* — Jason Daniel Prone
(74) *Attorney, Agent, or Firm* — Michael J. Striker

(57) ABSTRACT

A motor-driven, hand-guided reciprocating saw or jigsaw includes a saw blade which performs a working motion and a base plate which is connected to a housing of the reciprocating saw, where an underside of the base plate is used as a bearing surface which faces a workpiece to be worked, A guide element is intergrated in the base plate and extends past the bearing surface of the base plate. The guide element is provided for placement on a guide contour of a template which is connected to the workpiece. Saw teeth of saw blade are located at least approximately in the center of the guide element or are laterally offset from the center relative to the saw blade plane of the saw blade.

7 Claims, 3 Drawing Sheets

U.S. PATENT DOCUMENTS

| | | | |
|---|---|---|---|
| 6,357,123 B1 * | 3/2002 | Manuel | 30/392 |
| 6,467,177 B2 * | 10/2002 | Eichberger | 30/392 |
| 6,820,339 B2 * | 11/2004 | Albrightson | 30/392 |
| 7,313,868 B2 * | 1/2008 | Izumo | 30/392 |
| 2006/0179668 A1 * | 8/2006 | Wu | 30/392 |
| 2008/0052921 A1 | 3/2008 | Delfini et al. | |
| 2009/0106986 A1 | 4/2009 | Fuchs | |

FOREIGN PATENT DOCUMENTS

| | | |
|---|---|---|
| DE | 102006049530 A1 * | 4/2008 |
| DE | 102007030639 A1 * | 1/2009 |
| DE | 102007034529 A1 * | 1/2009 |
| WO | 2008/046712 | 3/2008 |

* cited by examiner

MOTOR-DRIVEN RECIPROCATING SAW, IN PARTICULAR A JIGSAW

BACKGROUND OF THE INVENTION

The present invention relates to a motor-driven reciprocating saw, in particular a jigsaw, according to the preamble of claim 1.

DE 10 2004 045 539 A1 describes an electrical, hand-guided jigsaw, the saw blade of which performs an oscillating, reciprocating motion in an up and down direction relative to a base plate which is secured in a housing, and which includes an opening through which the saw blade extends. The underside of the base plate is used as a bearing surface across which the jigsaw is guided on the workpiece to be worked.

To work the workpiece, the jigsaw is guided along a defined, curved trajectory in order to create the desired contour of the workpiece. To produce several identical workpieces, the curved shape must be drawn with the aid of a template, then the piece is sawed out in a free-hand manner using the jigsaw. This results in deviations between the various workpieces that were created, thereby making it necessary to rework them, which is time-consuming.

SUMMARY OF THE INVENTION

The object of the present invention is to provide a motor-driven reciprocating saw using simple design measures which makes it possible to create copies of identical workpieces with high accuracy.

This object is achieved according to the present invention with the features of claim 1. The dependent claims describe advantageous refinements.

In the motor-driven reciprocating saw according to the present invention, in particular a jigsaw, a guide element is integrated in the base plate and extends beyond the bearing surface of the base plate. This guide element is designed to be placed against a guide contour of a template which is connected to the workpiece to be worked. The saw teeth of the saw blade which extends through the base plate are situated at least approximately in the center of the guide element, or they are laterally offset from the center of the guide element while being situated at the level of this center point relative to the feed direction.

According to a first embodiment of the present invention in which the saw teeth of the saw blade are located directly or approximately directly in the center of the guide element, the guide element is designed, e.g. as a guide sleeve, through which the saw blade extends. While the reciprocating saw is being operated, this guide sleeve bears via its outer jacket surface against the guide contour of the template. As a result, the guide contour is automatically followed. The only aspect to take into consideration is the lateral offset between the outer wall of the guide sleeve—which bears against the wall of the guide contour—and the saw blade. This offset may be taken into consideration when creating the template and/or while working the workpiece. Since the saw teeth of the saw blade are situated in the region of the center of the guide sleeve, the saw blade—in the region of its saw teeth—is located equidistantly from all wall sections on the inside of the guide sleeve, thereby ensuring that the saw blade is guided reliably. In addition, an angular deviation is prevented from occurring between the feed direction of the hand-guided reciprocating saw and the plane through the saw blade, which could result in an unclean cut that deviates from the desired curved trajectory. In the embodiment according to the present invention, the feed and cutting direction is located in the plane of the saw blade even though it abuts the guide contour of the template. A decisive factor is that the contact point between the outer wall of the guide sleeve and the wall on the guide contour of the template lies on a line that extends perpendicularly through the plane of the saw blade at the level of the saw teeth.

This effect is also attained using a further embodiment according to the present invention, according to which the saw teeth of the saw blade are not situated directly in the center of the guide element. Instead, they are laterally offset from the center but are located at the level of this center point. This embodiment is realized, e.g. with the aid of a guide pin which is located with lateral clearance from the saw blade, and, in fact, in a manner such that the line through the center of the guide pin and the contact point between the outer jacket of the guide pin and the guide contour of the template coincide with the perpendicular lines through the saw blade plane at the level of the saw teeth. An undesired angular deviation between the feed direction and the saw blade plane is prevented in this case as well.

According to an expedient refinement, it is provided that the guide element is detachably retained on the base plate. This makes it possible to easily replace a first guide element with a second guide element having a different geometric shape, e.g. to better accommodate various contours. Another advantage of this embodiment is the fact that it makes it possible to subsequently install the guide element in the base plate of a hand-guided reciprocating saw.

For the case in which the guide element is designed as a guide sleeve, it advantageously includes a radially overhanging, annular shoulder which is situated in a complementary, annular recess in the base plate. This annular shoulder makes it easier to attach the guide sleeve to the base plate, e.g. such that boreholes are formed in the annular shoulder, via which the guide sleeve is attached to the base plate with the aid of screws.

It may also be expedient to provide the base plate with a raised receiving mandrel which is provided to accommodate the guide element. For the case in particular in which the guide element is designed as a guide pin, the guide element is advantageously situated in the mandrel, the lower section of the guide pin extending past the bearing surface of the base plate, in order to ensure that this section of the guide pin may bear against the contour of the template.

According to a further advantageous embodiment, a roller bearing for rolling on the guide contour of the template is provided on the base plate. This roller bearing advantageously encloses the guide element in a concentric manner, thereby retaining the basic angular relationships between the saw blade plane and the feed direction. The roller bearing causes only a slightly greater lateral offset between the contour of the template and the saw blade plane, but this may be taken into account via a corresponding placement of the template relative to the workpiece to be worked. The roller bearing reduces the forces required to move the hand-held power tool forward.

BRIEF DESCRIPTION OF THE DRAWINGS

Further advantages and advantageous embodiments are depicted in the further claims, the description of the figures, and the drawings.

DETAILED DESCRIPTION OF THE INVENTION

Figure 1:
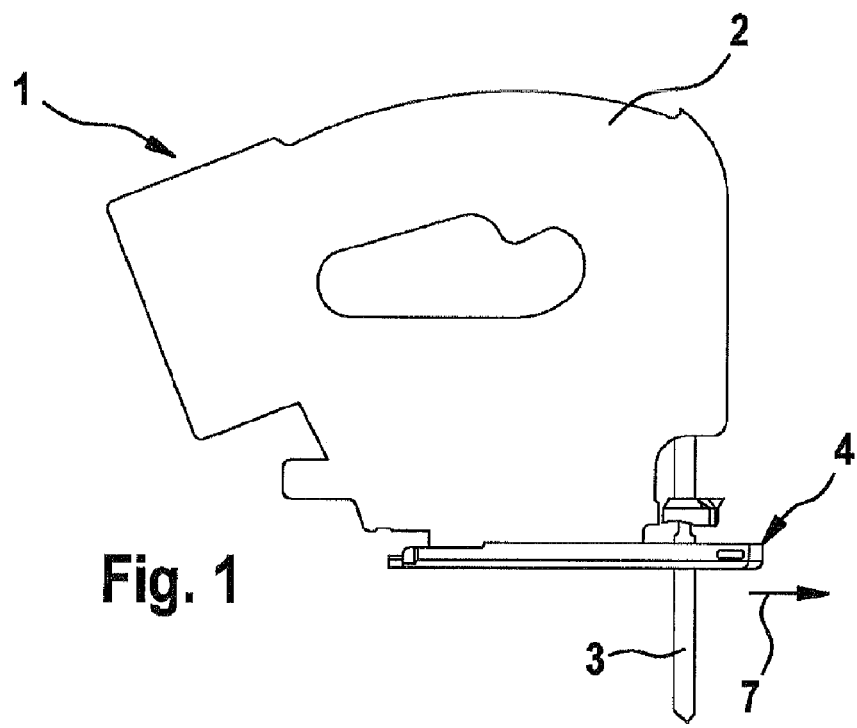
FIG. 1 is a schematic depiction of a side view of a jigsaw with a base plate located on the underside of the housing, which includes a passage for the saw blade.

Components that are the same are labelled with the same reference numerals in the figures.

The hand-held power tool shown in FIG. 1 is an electric jigsaw 1 with a housing 2 and a saw blade 3 which performs a vertically oscillating, reciprocating motion, and which extends through an opening in a base plate 4 which is fixedly connected to housing 2 of the jigsaw. The feed or working direction of jigsaw 1 is indicated by arrow 7. The underside of base plate 4 facing away from housing 2 is used as a bearing surface which rests on a workpiece to be worked or a template while the jigsaw operates.

Figure 2:
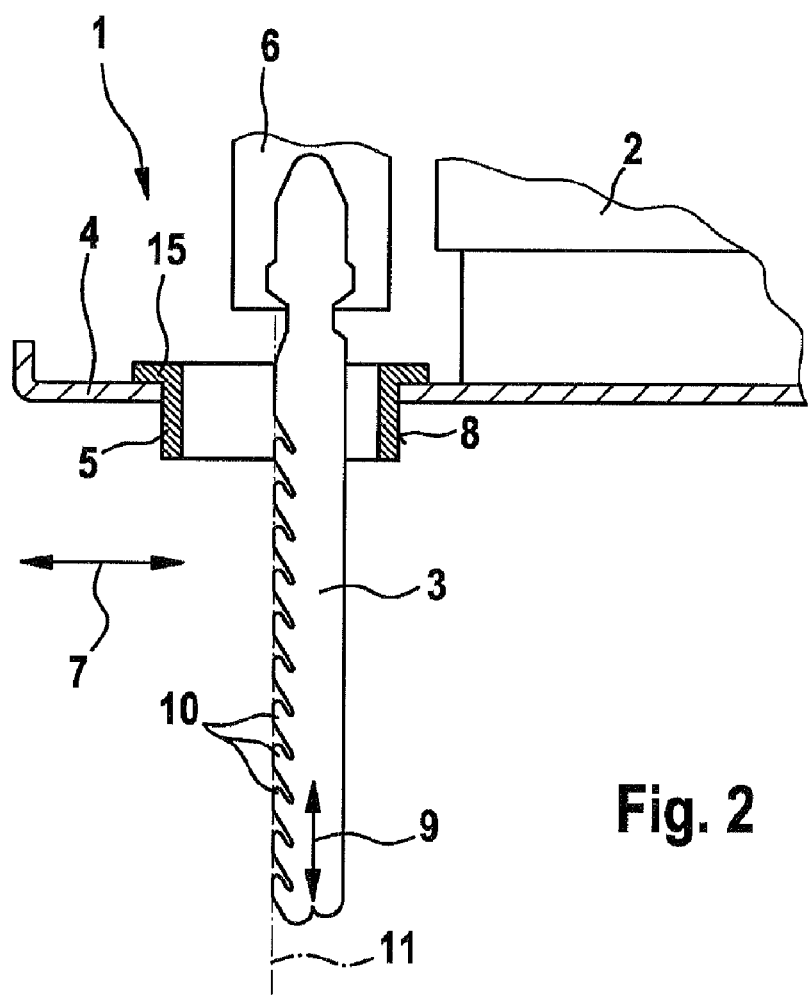
FIG. 2 is a sectional view through the base plate with a depiction of a guide sleeve as the guide element, through which the saw blade passes, and which is designed for guidance along a guiding contour of a template.

As shown in the sectional view in FIG. 2, a guide sleeve 5 is installed in a recess in base plate 4, through which saw blade 3 extends. The recess in base plate 4 in which guide sleeve 5 is inserted is, in particular, the opening in the base plate through which the saw blade extends, thereby making it possible to subsequently install a guide sleeve 5. Guide sleeve 5 extends past the lower bearing surface of base plate 4 and is used as a copying sleeve in that outer jacket surface 8 of guide sleeve 5 is guided along a guiding contour of a template which is fixedly connected to the workpiece to be worked. FIG. 2 also shows a holder 6 for holding saw blade 3. Holder 6 also imparts the working motion indicated via double arrow 9 to saw blade 3.

The position of saw blade 3 in guide sleeve 5 is selected such that saw teeth 10 of the saw blade extend directly along longitudinal axis 11 through guide sleeve 5. Saw teeth 10 are therefore located directly in the center of guide sleeve 5.

Figure 3:
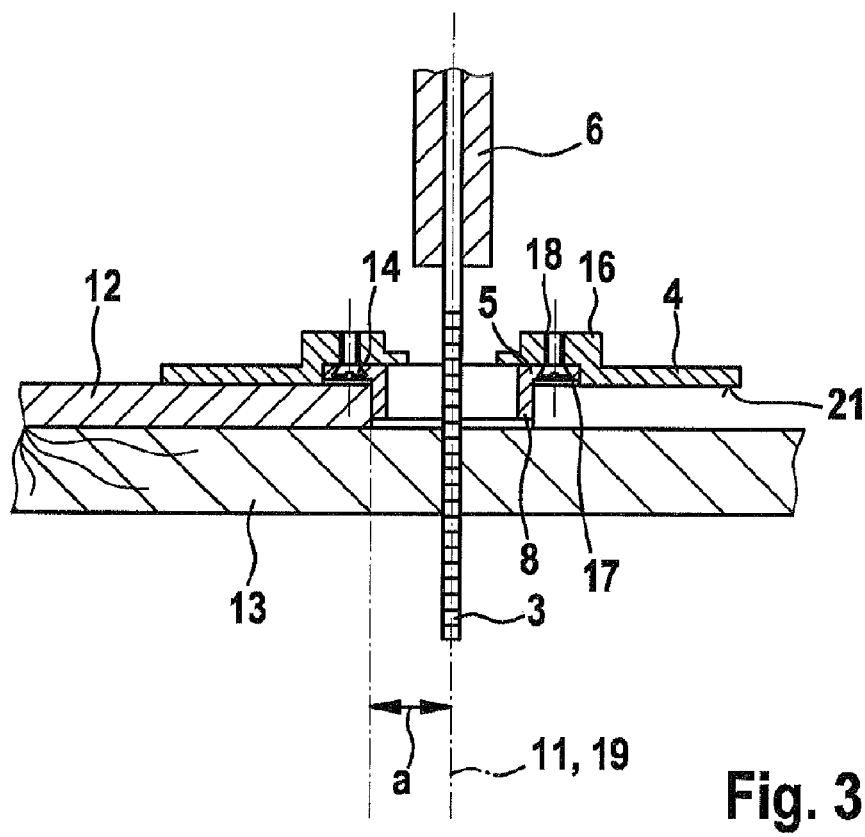
FIG. 3 is a detailed depiction of a sectional view through the base plate of a jigsaw, including a template and a workpiece to be worked.
Figure 4:
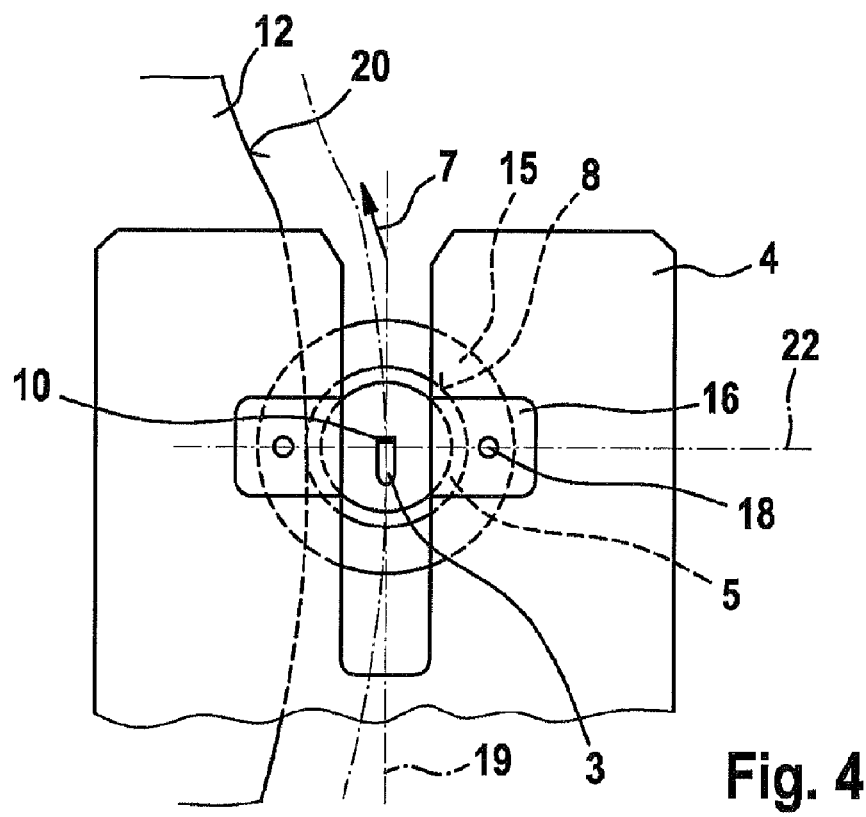
FIG. 4 shows the base plate and saw blade, including a guide sleeve having the design in FIG. 3, in a top view, including a depiction of a curved course of the guiding contour of the template.

As shown in the detailed illustrations in FIGS. 3 and 4, guide sleeve 5 includes a radially overhanging, annular shoulder 15 via which the guide sleeve is attached to base plate 4. Base plate 4 includes a raised projection 16, in the underside of which an annular recess 17 is formed, and which is used to accommodate annular shoulder 15 of guide sleeve 5. Using annular shoulder 15, the guide sleeve is attached with the aid of flat-head screws 14 which are guided through recesses in annular shoulder 15 and are screwed into threaded bores 18 in projection 16 of base plate 4.

The underside of base plate 4 is used as bearing surface 21 for placing the jigsaw on a template 12 which is fixedly connected to workpiece 13 to be worked. The lateral contour of template 12 is used as a guiding contour 20 for outer jacket surface 8 on guide sleeve 5. Guiding contour 20 on template 12 may have a curved shape; due to the round cross section of guide sleeve 5, guide sleeve 5 may easily follow the course of guiding contour 20. As a result, the course of guiding contour 20 is also reproduced in workpiece 13 to be worked, but with a lateral offset a which is the distance between longitudinal axis 11 of guide sleeve 5 and outer jacket surface 8 which bears against guiding contour 20 during operation of the jigsaw. Longitudinal axis 11 of guide sleeve 5 also lies in saw blade plane 19 of saw blade 3. The contact point between outer jacket surface 8 on guide sleeve 5 and guiding contour 20 in template 12 lies in a perpendicular 22 through saw blade plane 19 at the level of the center point of guide sleeve 5, i.e., at the level of longitudinal axis 11.

Figure 5:
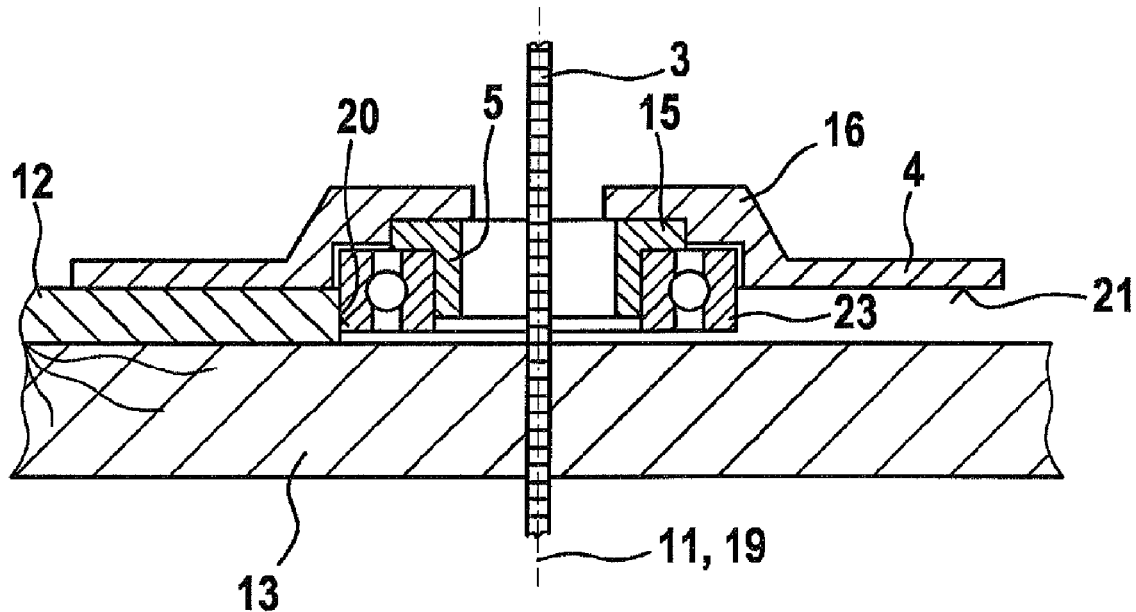
FIG. 5 is a sectional view of a jigsaw with a guide sleeve in the base plate and a roller bearing which encloses the guide sleeve.

The embodiment shown in FIG. 5 is basically similar to that shown in FIGS. 3 and 4, but with the difference that guide sleeve 5 is enclosed by a roller bearing 23, the radial outer side of which bears against the guiding contour of template 12 and defines a roll-off surface, thereby reducing resistance in the feed direction. Roller bearing 23 is also fitted in an annular recess located on the underside of base plate 4.

Figure 6:
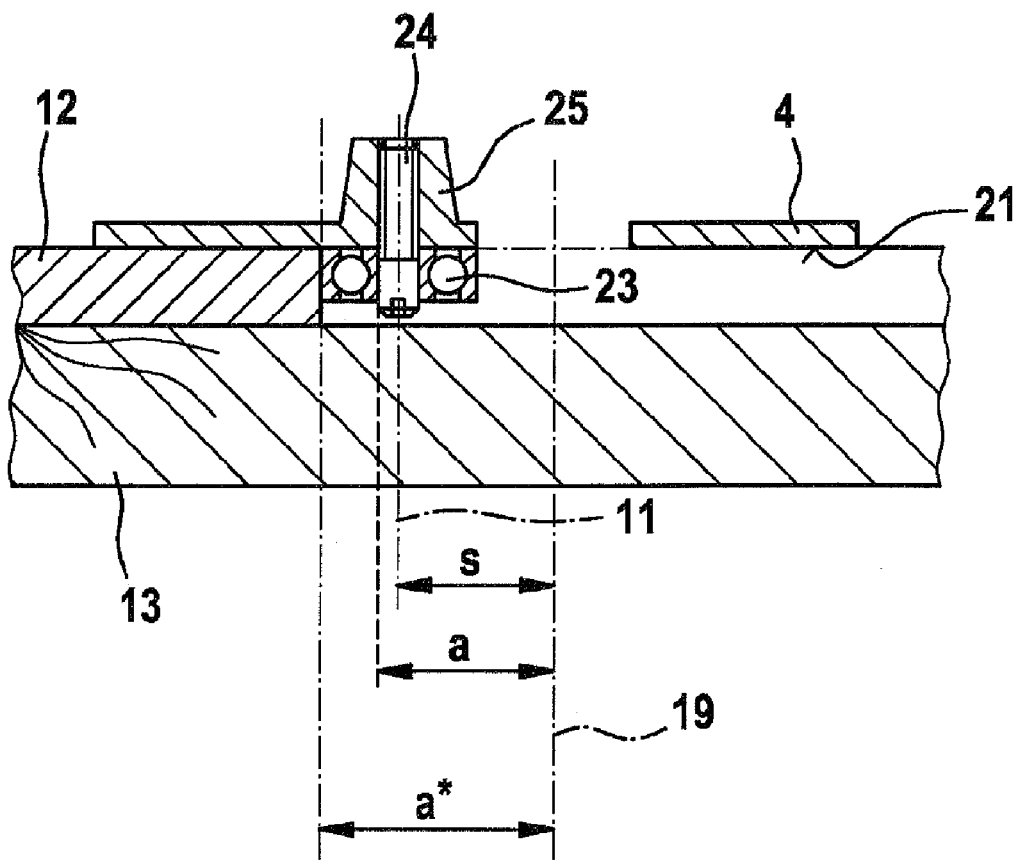
FIG. 6 shows a further exemplary embodiment of a jigsaw, shown in a sectional view, with a guide element designed as a guide pin, which is laterally offset relative to the saw blade.

A further embodiment is shown in FIG. 6. The guide element which is designed for placement and guidance along the guiding contour of template 12 is designed as guiding pin 24 which is situated in a raised receiving mandrel 25 designed as a single piece with base plate 4. The distance between longitudinal axis 11 through guide pin 24 and saw blade plane 19 through the saw blade is labeled with an "s". The distance between the outer jacket surface on guide pin 24 and saw blade plane 19 is labeled with an "a". The guide pin is therefore laterally offset from saw blade 3, but in a manner such that longitudinal axis 11 lines on a perpendicular to saw blade plane 19, and at the level of the saw teeth of the saw blade, relative to the feed direction.

According to a modified embodiment, an additional roller bearing 23 is provided, and it encloses the section of guide pin 24 that extends past lower bearing surface 23 on base plate 4. In this case, the distance between the outer jacket surface on roller bearing 23, which comes to bear against the guiding contour of template 12, and saw blade plane 19 is labeled with an "a*".

What is claimed is:

1. A motor-driven, hand-guided reciprocating saw, comprising
    a housing,
    a saw blade with saw teeth,
    a base plate with a recess, the base plate is connected to the housing of the saw, an underside of the base plate is a bearing surface, the bearing surface faces a workpiece to be worked, and
    a guide element including a through hole and a wall, the wall is located in the recess of the base plate and extends past the bearing surface, the saw blade extends through the through hole and is surrounded by the wall of the guide element, wherein the saw teeth are located at least approximately in a center of the through hole.

2. The reciprocating saw as recited in claim 1, wherein the guide element is detachably retained in the recess of the base plate.

3. The reciprocating saw as recited in claim 1, wherein the wall includes a radially overhanging, annular shoulder which is situated in the recess of the base plate or adjacent the recess of the base plate.

4. The reciprocating saw as recited in claim 1, wherein the guide element is designed as a guide pin.

5. The reciprocating saw as recited in claim 4, wherein the guide pin is insertable in a raised receiving mandrel of the base plate.

6. The reciprocating saw as recited in claim 1, wherein a roller bearing which rolls on a template is provided on the base plate.

7. The reciprocating saw as recited in claim 6, wherein the roller bearing concentrically encloses the guide element.

* * * * *